(12) United States Patent
McMahon

(10) Patent No.: US 6,337,115 B1
(45) Date of Patent: Jan. 8, 2002

(54) SHAPE-RECOVERING MATERIAL SUITABLE FOR APPLICATION OF NON-DISTORTING PRINTED MATTER, AND ITS USE

(75) Inventor: Roy P. McMahon, Indianapolis, IN (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/364,338

(22) Filed: Jul. 30, 1999

(51) Int. Cl.[7] ............................................. B65B 53/02
(52) U.S. Cl. .................... 428/36.9; 138/110; 138/149; 156/86; 156/155; 156/229; 156/244.17; 156/272.2; 174/74; 206/219; 206/221; 215/12.2; 220/62.22; 414/685
(58) Field of Search ................................ 428/346, 65.2, 428/36.9, 35, 34.9; 264/30; 215/12; 206/389, 30; 326/34; 403/27; 260/17

(56) References Cited

U.S. PATENT DOCUMENTS

| | | | | |
|---|---|---|---|---|
| 3,684,755 A | * | 8/1972 | Gumerman | 260/17 |
| 3,734,273 A | * | 5/1973 | Watanabe | 206/46 |
| 3,957,382 A | * | 5/1976 | Greuel, Jr. et al. | 403/27 |
| 4,064,296 A | * | 12/1977 | Bornstein et al. | 428/35 |
| 4,608,284 A | * | 8/1986 | Roales | 428/35 |
| 4,929,477 A | * | 5/1990 | Will | 428/34.9 |
| 6,015,600 A | * | 1/2000 | Greuel, Jr. et al. | 428/34.9 |
| 6,065,847 A | * | 5/2000 | Palmer et al. | 326/34 |

\* cited by examiner

Primary Examiner—Harold Pyon
Assistant Examiner—Shalie Manlove
(74) Attorney, Agent, or Firm—Willaim C. Schubert; Glenn H. Lenzen, Jr.

(57) ABSTRACT

A body is enclosed by an elongated tube of shape-recovering tubing having a direction of elongation and having materials properties described by a recovered state and an expanded state which contracts toward the recovered state upon heating. The piece of shape-recovering tubing is processed to have a first region in the recovered state, the first region being in the form of a stripe extending parallel to the direction of elongation, a second region in the expanded state, and, optionally, printed matter on the first region. The tube is positioned overlying the body, and the second region is heated so that it contracts toward the recovered state.

22 Claims, 3 Drawing Sheets

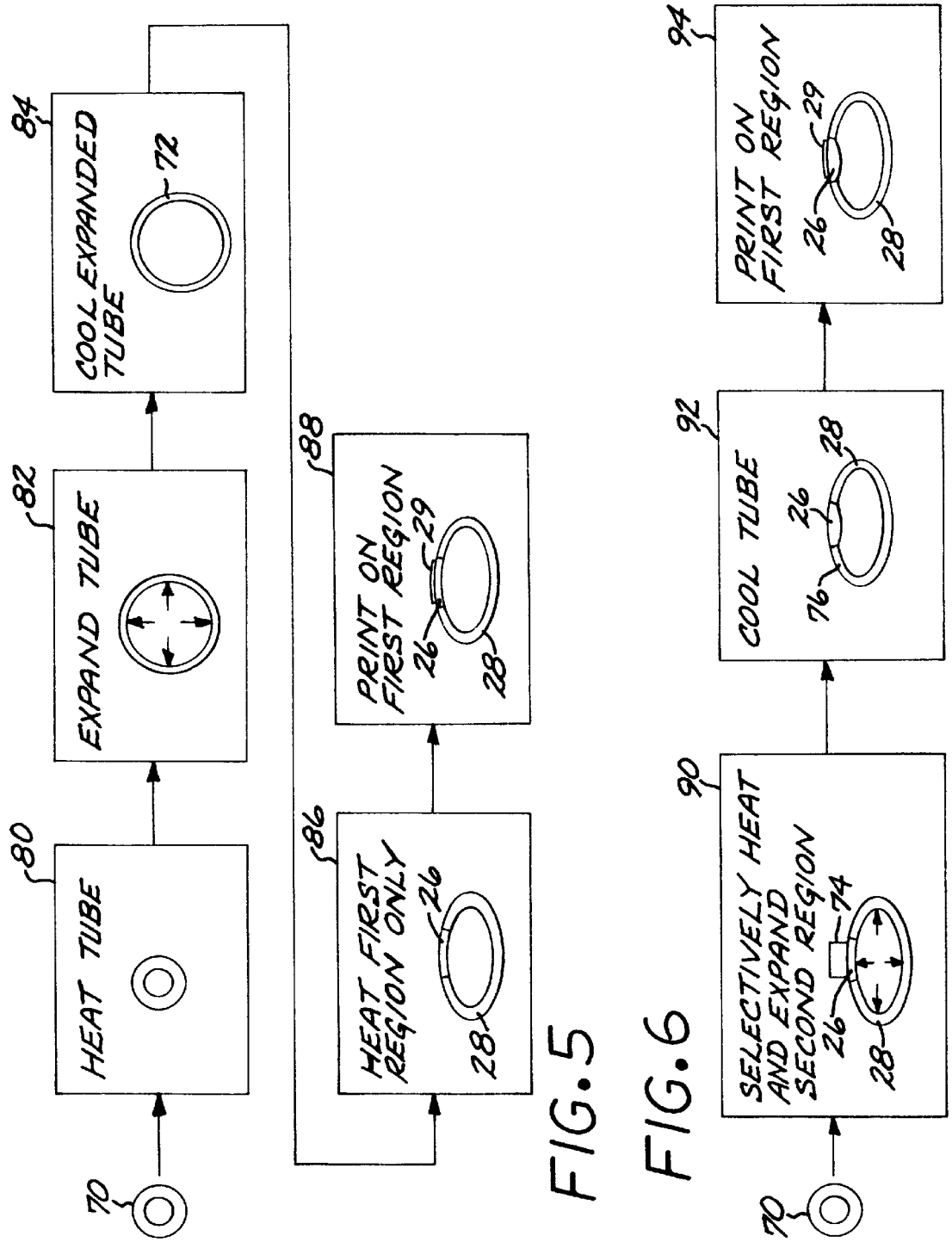

SHAPE-RECOVERING MATERIAL SUITABLE FOR APPLICATION OF NON-DISTORTING PRINTED MATTER, AND ITS USE

BACKGROUND OF THE INVENTION

This invention relates to shape-recovering material, especially in a tubular form, and, more particularly, to shape-recovering material with printed matter thereon.

Shape-recovering material, sometimes also called heat-shrinkable material, is widely used in marking and packaging applications. A working definition used herein is that the shape-recovering material is a polymer having materials properties described by a recovered state and an expanded state which contracts toward the recovered state upon heating. When the shape-recovering material is provided in tube form, it is typically structured to contract to or toward a specified size in the recovered state. In its initial manufacturing, the shape-recovering material is typically extruded in a particular shape and size, expanded to the expanded state, and thereafter cooled so that the expanded state is retained. When it is to be applied in service, the expanded and cooled material is placed overlying a body to be enclosed, and then again heated so that it contracts back toward the recovered state, thereby enclosing the body in a polymeric covering.

In a marking application, a tube of shape-recovering material is extruded, heated and expanded circumferentially by internal pressure, and cooled. At a later time, it is printed with printed matter. The printed tube is placed overlying a length of electrical wire, such as one or more lengths of electrical wire in a wiring harness. The tube is heated, so that the tube shrinks around the wire(s), thereby identifying the enclosed wire(s) by the applied printed matter in a manner that does not interfere with the function and does not require the use of tags or the like.

When the tube is shrunk, the printed matter distorts, because the tube shrinks circumferentially by a substantial amount but very little axially. For example, if the tube is circumferentially shrunk by a contraction ratio of 3:1 in the final contraction onto the wire, the height of any printing on the tube distorts in the circumferential direction by a factor of about 3:1. The printing is often so distorted either before or after shrinking that it may be difficult to read in one state or the other. If the printed matter is applied in a pre-distorted condition that compensates for the distortion that occurs during shrinking, it will be difficult to read prior to shrinking. If the printed matter is applied in the same proportions as desired on the final shrunk tube, the distortion during shrinking makes the printing difficult to read after shrinking. Additionally, there is no certainty that the shape-recovering material will always shrink fully and uniformly to the recovered state, so that the degree of distortion is not predictable.

There is a need for a technique for making and using shape-recovering material with printed matter thereon, where the printed matter does not substantially distort as the shape-recovering material is applied to a body to be enclosed. The present invention fulfills this need, and further provides related advantages.

SUMMARY OF THE INVENTION

The present invention provides a shape-recovering material, a method for its production, and a method for its use with or without printed matter thereon. The printed matter, when present, does not distort during the shrinking of the shape-recovering material onto the body to be enclosed. If the shape-recovering material contracts only partially and/or nonuniformly in the final shrinking operation, the printed matter remains readable and substantially undistorted. The present approach may be utilized with only minor changes to the production of the shape-recovering material.

In accordance with the invention, an article comprises a layer having a circumferential direction and a longitudinal reference direction lying in the layer and perpendicular to the circumferential direction. The layer is made of a shape-recovering polymeric material having materials properties described by a recovered state and an expanded state which contracts toward the recovered state upon heating. The layer has a first region in the recovered state, with the first region comprising one or more stripes extending parallel to the longitudinal reference direction. There is also a second region in the expanded state. In a preferred application, there is printed matter on the first region.

In a particularly preferred embodiment, the article is a hollow tube having a direction of elongation and a tube wall. The tube wall is made of a shape-recovering polymeric material having materials properties described by a recovered state and an expanded state which contracts toward the recovered state upon heating. The tube wall has a first region in the recovered state. The first region comprises one or more stripes extending parallel to the direction of elongation, preferably with printed matter on the first region. There is also a second region in the expanded state.

The article may be made of any known or newly discovered type of shape-recovering material having the properties described herein. Examples of such materials include polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene.

The article is used to enclose a body. In a preferred embodiment, the article is a tube placed overlying an electrical wire, or a bundle of electrical wires, and then shrunk into a snug fit over the wire(s).

A method in accordance with the invention for enclosing a body comprises the steps of providing a piece of shape-recovering material having materials properties described by a recovered state and an expanded state which contracts toward the recovered state upon heating. The piece is processed to have a first region in the recovered state, a second region in the expanded state, and, preferably, printed matter on the first region. The piece is positioned overlying the body, and the second region is heated so that it contracts toward the recovered state, thereby shrinking around the body. The step of processing is preferably accomplished by one of two techniques, with a starting material having the first region in the recovered state and the second region in the recovered state. In one preferred technique, the first region is expanded to the expanded state and the second region is expanded to the expanded state, usually simultaneously, and thereafter the first region is recovered to the recovered state. The printed matter, where used, is thereafter applied to the first region. In the other preferred technique, the second region is expanded to the expanded state while maintaining the first region in the recovered (in this case, unexpanded) state. The printed matter, where used, is thereafter printed onto the first region. The piece of shape-recovering material may be a piece of tube.

The present invention allows high-shrinkage shape-recovering materials to be used in applications which otherwise would not be feasible because of the distortion of printed matter during heat-induced contraction from the expanded state to the recovered state. It is desirable to use printed tubes having a contraction ratio of at least about 4:1 for marking some types of wire bundles to which connectors are already attached, because the expanded tubes can be slipped over the enlarged connectors at the ends of the bundles and then contracted to fit snugly onto the wires of the wire bundle. Conventional tubing usually cannot be used for this application, because the distortion of the printing during the contraction of 4:1 or greater makes the printing unreadable. With the present approach, because there is substantially no distortion of the printing during contraction, printed tubes having a contraction ratio of 4:1 or greater can be used for this and other applications. Printed tubes of shape-recovering materials can therefore be utilized in a wider range of applications than heretofore possible.

In the approach of the invention, the piece of the shape-recovering material is apportioned into two regions, which are processed differently. When it is used in the preferred application, printed matter is applied only to the material in the recovered state, and which does not subsequently shrink during heating. There is therefore substantially no distortion of the printed matter during contraction. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

BRIEF DESCRIPTION OF THE DRAWINGS

FIGS. 3A–3B are side views of a hollow tube of shape-recovering material with printed matter thereon, processed using conventional processing, wherein FIG. 3A depicts the tube prior to shrinking, and FIG. 3B depicts the tube after shrinking;

FIG. 5 is a pictorial block flow diagram of a first embodiment of a procedure for processing the hollow tube; and FIG. 6 is a pictorial block flow diagram of a second embodiment of a procedure for processing the hollow tube.

DETAILED DESCRIPTION OF THE INVENTION

Figure 1A:
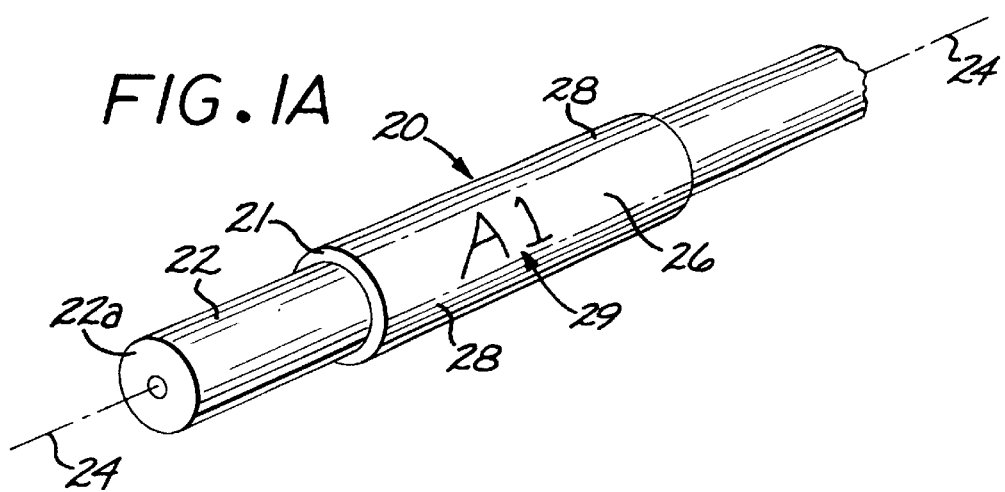
FIGS. 1A–1B are perspective views of a hollow tube of shape-recovering material overlying a single wire body (FIG. 1A) and a bundle of wires (FIG. 1B)
Figure 1B:
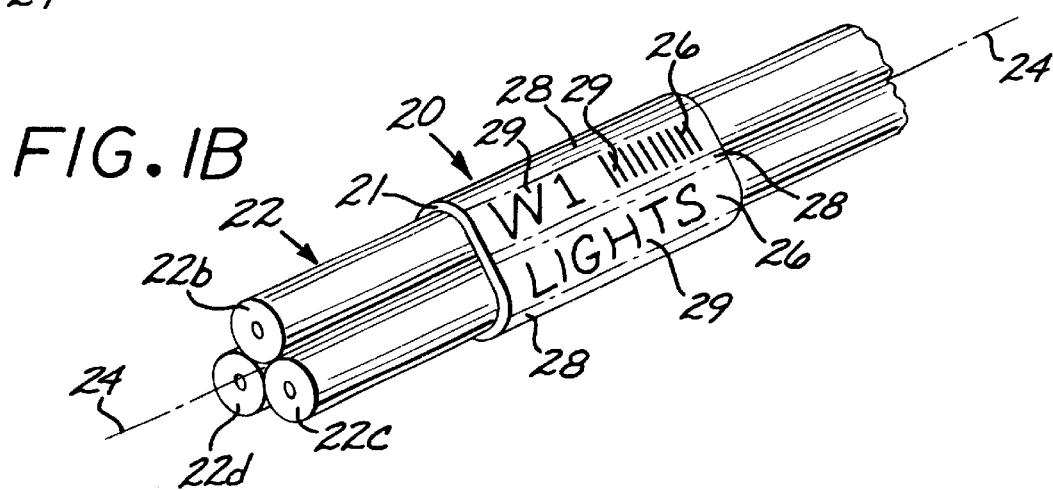

FIGS. 1A and 1B each depict a length of elongated, hollow tube 20 with an annular wall 21 overlying an enclosed body 22. (As used herein the "tube" may be, but need not be, circular when viewed in cross section.) In FIG. 1A, the body 22 is a length of a single electrical wire 22*a* including a conductive wire and electrical insulation thereon. In FIG. 1B, the body 22 comprises a bundle of three electrical wires 22*b*, 22*c*, and 22*d*. Such bundles of electrical wires may include two or more electrical wires, and in some cases may include many electrical wires. Electrical connectors (not shown) may be already attached to the ends of some or all of the electrical wires. The tube 20 has a direction of elongation 24, which serves as a reference direction.

The tube 20 (and specifically its wall 21) is made of a shape-recovering polymeric material having materials properties described by a recovered state and an expanded state which contracts toward the recovered state upon heating. The material and tubing of the preferred embodiment are discussed and specified more fully in MILSPEC MIL-DTL-23053, whose disclosure is incorporated by reference. Such polymeric materials are well known in the art for other applications, but not for the present application, and are sometimes called "heat-shrinkable tubing" or "shrink tubing". Examples of operable materials include polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene, but use of the invention is not limited to these materials. The present invention is operable with all such shape-recovering polymeric materials.

The tube 20 has a first region 26 in the form of a stripe extending parallel to the direction of elongation 24. The remainder of the circumference of the tube 20 is a second region 28. FIG. 1A depicts a single first region 26, in the form of a single stripe, while FIG. 1B depicts two such first regions 26, as two stripes.

The first region 26 optionally but preferably has printed matter 29 thereon when used in its final application. In the embodiment of FIG. 1A, the printed matter 29 is illustrated as "A1". In the embodiment of FIG. 1B, one of the first regions 26 has the printed matter 29 "W1" and a bar code, and the other of the first regions 26 has the printed matter 29 "LIGHTS". "Printed matter" and "printing" are used in a general sense herein, to include all types of information imprinted onto the first region. Examples of such printed matter and printing include alphanumeric characters, drawings or diagrams, codes, bar codes, and the like, but the printed matter and printing are not limited to these examples. The printed matter acts as identification for the body 22 after the tube is contracted to fit snugly around the wire or wires.

Figure 2:
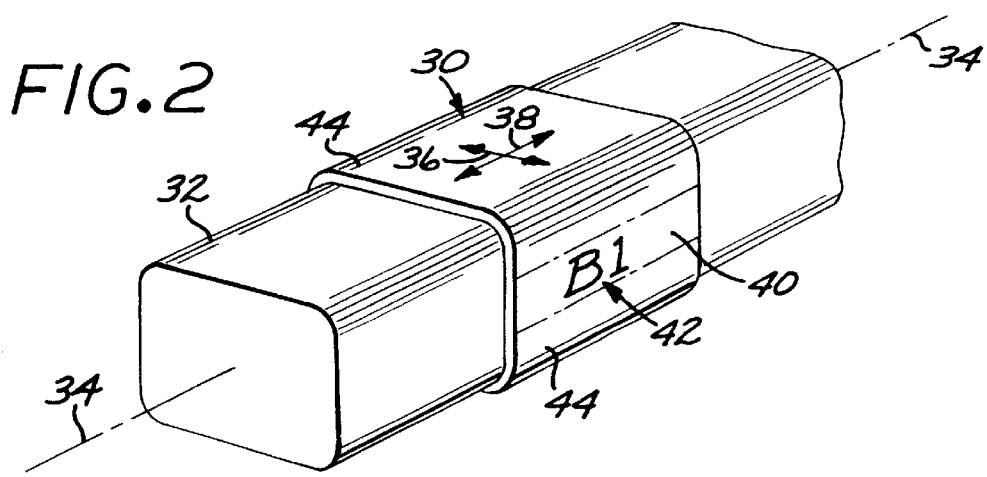
FIG. 2 is a perspective view of a thin layer of shape-recovering material overlying a body.

FIG. 2 illustrates more generally a layer 30 of the shape-recovering polymeric material overlying a body 32. The body 32, while not necessarily in the form of a wire or a wire bundle, may be characterized as having a reference direction 34. The body may include an single object, as in FIG. 1A, or multiple objects, as in FIG. 1B. The layer 30 has a circumferential direction 36 lying locally in the plane of the layer 30 and extending around the periphery of the body 32 (i.e., locally parallel to the surface of the body 32). The layer 30 also has a longitudinal reference direction 38 lying locally in the plane of the layer 30 and perpendicular to the circumferential direction 36. A first region 40 of the layer 30 is in the form of stripe extending parallel to the longitudinal reference direction 38. There may be more than one first region 40, as was discussed in relation to FIG. 1B. There may be printed matter 42 on the first region 40, illustrated as "B1". The remainder of the circumference of the layer 30 is a second region 44.

The present invention is preferably practiced in relation to the tube structure of FIGS. 1A and 1B, and it will be discussed in relation to these preferred embodiments. The following discussion is applicable to the embodiment of FIG. 2 as well.

Figure 3A:
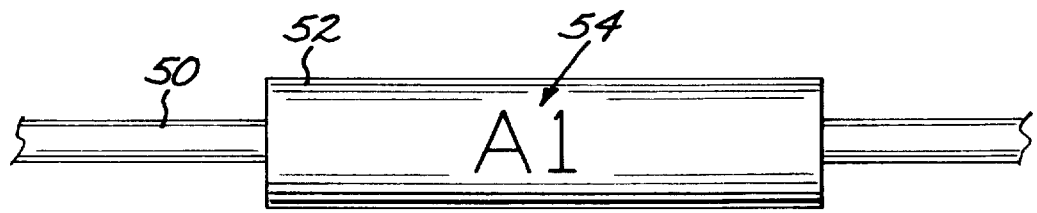
Figure 3B:
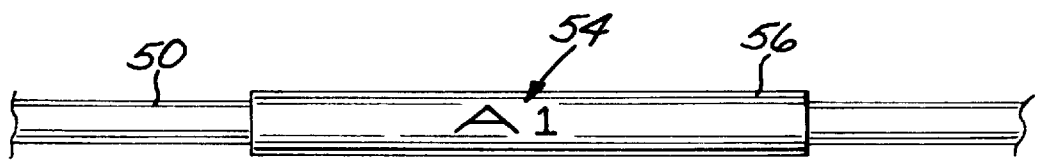

FIGS. 3A and 3B illustrate a conventional approach for marking a single wire 50 using shrink tube made of the shape-recovering material. An expanded piece 52 of shrink tube with printed matter 54 thereon is placed over the wire 50, FIG. 3A. The expanded piece 52 is heated so that the shape-recovering material contracts circumferentially and shrinks onto the wire 50, FIG. 3B, becoming a recovered piece 56 of shrink tube. The printed matter 54 is retained, but it is distorted because the expanded piece 52 shrinks by a substantial amount circumferentially but very little axially along the length of the wire 50. The result is a relative shortening and distortion of the printed matter 54 in the circumferential direction, as seen in FIG. 3B. The printed matter 54 becomes hard to read, particularly in conditions of low-light or where the wire 40 is located so as not to be readily accessible to view. If the printed matter is designed to be machine readable, such as a bar code, the distortion may make it unreadable or may lead to false readings. This distortion of the printed matter might be compensated to some degree by applying the printed matter 54 in a pre-distorted form, elongated in the circumferential direction. Such compensation is not fully satisfactory, because then the expanded piece 52 is suitable only for a specific size of wire 50 (a particular problem where it is wire bundles of different sizes that are to be marked), and because the shrinkage around the wire is not always uniform with the result that there may still be distortion of the printed matter 54.

Figure 4:
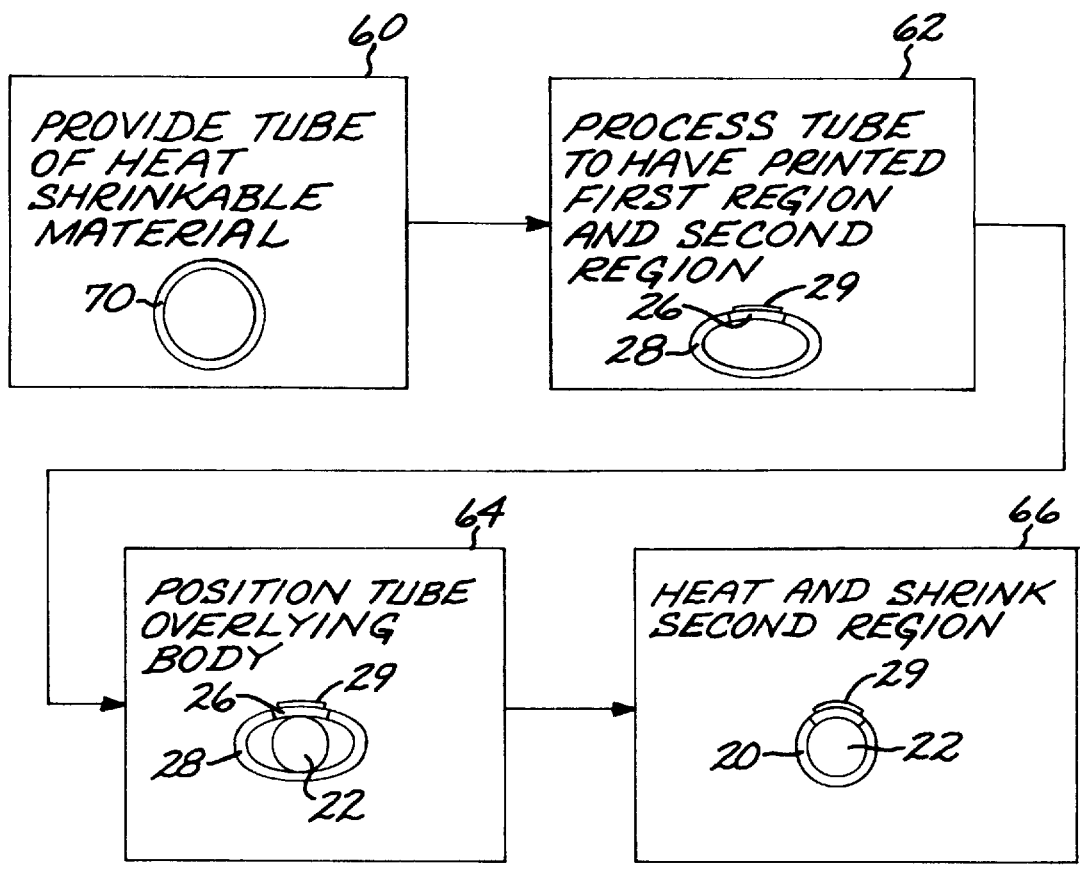
FIG. 4 is a pictorial block flow diagram of a technique for practicing the present invention.

FIG. 4 illustrates a method in accordance with the invention, both narratively and pictorially. The diagrams illustrate the marking of a body comprising a single object, here a single electrical wire, but the method is equally applicable to the marking of a body comprising multiple objects, such as a bundle of wires. A tube 70 of shape-recovering, heat-shrinkable material is provided, numeral 60. The tube 70 is made of a shape-recovering polymer such as those discussed above. Such tube 70 is available commercially in a range of sizes, materials of construction, colors, and other physical characteristics, from vendors that supply tube according to MIL-DTL-23053. The tube 70 is typically relatively thick-walled, and sized to fit over the body to be enclosed when the tube is expanded and then contracted.

The tube 70 is processed, numeral 62, to have the first region 26 in the recovered state and the second region 28 in the expanded state. In the preferred embodiment whose approach is illustrated, there is also printed matter 29 in the first region, but the presence of printed matter is optional. The present approach is operable either in the presence or the absence of printed matter 29. In processing, the material making up the wall of the tube is intentionally treated so that the first region 26 and the second region 28 are defined, and, where present, printed matter 29 is placed onto the first region 26. There are two preferred techniques for performing the processing step 62, illustrated in FIGS. 5 and 6, respectively.

Referring to the presently most preferred approach of FIG. 5, the tube 70 is heated, numeral 80, to the temperature at which it is normally expanded for the selected material of the tube 70, and circumferentially expanded, numeral 82, to stretch the material of the tube to its expanded state. The steps 80 and 82 are normally performed simultaneously. The expansion 82 is preferably performed by internal air pressure within the tube 70, and results in uniform circumferential expansion of the tube 70. Equivalently, the shape-recovering material may be expanded by other mechanical techniques. The tube is cooled to room temperature, numeral 84, while the internal pressure is maintained, "freezing in" the expanded state of the expanded tube 72. The first region 26 is thereafter heated to cause it to contract and shrink back to the recovered state, numeral 86. The second region 28 is not heated, and is left in its expanded state. The recovery of the first region 26 leaves it with a larger wall thickness than the second region 28, so that the first region 26 may be easily recognized visually. These steps 80, 82, 84, and 86 would typically be performed by a manufacturer of the tube, but could be performed by the user or others. The printed matter 29 is thereafter optionally applied to the recovered first region 26, numeral 88. The printing is accomplished by any operable technique, such as by hand marking, with a stencil, with a rubber stamp, with a label, or with a commercially available tube-imprinting machine. The printing step 88 could be performed by the manufacturer of the tube, but more typically would be performed by a user to custom imprint the tube for specific applications, such as the labeling of wires or wire bundles.

In the approach of FIG. 6, the tube 70 is selectively heated and internally pressurized to expand only the second region 28, numeral 90. The first region 26 remains in its recovered and unexpanded state. The selectively may be achieved by cooling the first region 26, as with a cold finger 74 that contacts the outer surface of the first region 26, while the remainder of the tube 70, constituting the second region 29, is heated. The internal pressurizing gas then causes only the second region 28 to stretch and expand. The tube is thereafter cooled, while the internal pressure is maintained, to "freeze in" the expanded state of the second region of the expanded tube 76. The steps 90 and 92 would typically be performed by the manufacturer of the tube, but could be performed by the user or others. As with the embodiment of FIG. 5, the first region 26 is of a greater wall thickness than the second region 28, and therefore is easily recognized. The printed matter 29 is thereafter optionally applied to the first region 26, as described above, which is in the recovered state because it was never expanded in this process. The printing step 94 could be performed by the manufacturer of the tube, but more typically would be performed by a user to custom imprint the tube for specific applications, such as the labeling of wires or wire bundles.

Returning to FIG. 4, the processed tube is positioned, numeral 64, overlying the body 22 to be enclosed, which in this case is the wire to be marked. The tube is thereafter heated, numeral 66, to cause the second region 28 to contract and shrink circumferentially, and thereby enclose the body 22. The second region shrinks back to about its original wall thickness, so that there is no substantial visual difference between the first region 26 and the second region 28, except for the presence of the printed matter 29 on the first region 26. During the heating step 66, the first region 26 and its applied printed matter 29 do not contract and shrink circumferentially, because the first region 26 is already in the recovered state. The result is that the printed matter 29 does not substantially change in size or shape during the heating step 66, so that it remains in the same size and shape as it was when applied to the first region 26.

One of the applications of most potential interest is the use of printed tubes of shape-recovering polymeric material to mark wire bundles which already have the end electrical connectors attached to the wires. For such an application, the tube typically must have a high contraction ratio of at least about 4:1, so that it may be slipped over the connectors at the ends of the wires in the expanded state, moved along the length of the wires to the desired location, and then contracted by the application of heat to the recovered state to fit snugly around the wires. The "contraction ratio" is the ratio of the circumference of the tube in the expanded state to the circumference of the tube in the recovered state. Tubes may be purchased of various shape-recovering materials of construction and in various configurations to have different contraction ratios, typically ranging from about 2:1 to as high as about 6:1 or higher. However, the use of tubes having a contraction ratio of more than about 4:1 with printed matter along the sides of the tubes has not heretofore been feasible because of the high degree of distortion of the printed matter experienced during contraction to the recovered state. With the present approach which avoids distortion of the printed matter, the pre-printed tube of shape-recovering material having a contraction ratio of more than about 4:1 may be used in the labeling of wire bundles having the connectors already attached, and other applications requiring a high contraction ratio.

The present invention has been reduced to practice using the approach of FIGS. 4 and 5. After the completion of the application of the tube overlying the wire body, the first region and the second region were indistinguishable in the appearance of the tube material, although the substantially undistorted printed matter is present on the first region.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An article comprising
   a hollow tube having a direction of elongation and a tube wall made of a shape-recovering polymeric material having materials properties described by a recovered state and an expanded state which contracts toward the recovered state upon heating, the tube wall having:
      at least one first region in the recovered state, each first region comprising a stripe extending parallel to the direction of elongation, printed matter on the first region, and
      a second region in the expanded state;
   a body within an interior of the hollow tube, the body comprising at least one electrical wire.

2. The article of claim 1, wherein the layer is made of a material selected from the group consisting of polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene.

3. The article of claim 1, wherein the layer overlies an enclosed body, with the circumferential direction extending around the enclosed body.

4. The article of claim 1, wherein the tube overlies a wire.

5. The article of claim 1, wherein the tube overlies a bundle of wires comprising at least two wires.

6. The article of claim 1, wherein the tube has a contraction ratio of at least about 4:1.

7. The article of claim 1, further including
   at least one additional first region, each additional first region comprising a stripe extending parallel to the direction of elongation.

8. A method for enclosing a body, comprising the steps of:
   providing a piece of shape-recovering material having materials properties described by a recovered state and an expanded state which contracts toward the recovered state upon heating;
   processing the piece of shape-recovering material to have
      a first region in the recovered state, and
      a second region in the expanded state;
   positioning the piece of shape-recovering material overlying the body; and
   heating the second region so that it contracts toward the recovered state, thereby shrinking around the body.

9. The method of claim 8, wherein the step of processing includes the additional step of
   applying printing to the first region.

10. The method of claim 8, wherein the step of processing includes the steps of
    providing the piece of shape-recovering material with the first region in the recovered state and the second region in the recovered state, and thereafter
    stretching the second region to the expanded state while maintaining the first region in the recovered state.

11. The method of claim 8, including an additional step, after the step of stretching, of
    printing printed matter onto the first region.

12. The method of claim 8, wherein the step of processing includes the steps of
    providing the piece of shape-recovering material with the first region in the recovered state and the second region in the recovered state, thereafter
    stretching the first region to the expanded state and the second region to the expanded state, and thereafter
    contracting the first region to the recovered state.

13. The method of claim 8, including an additional step, after the step of contracting, of
    printing printed matter onto the first region.

14. The method of claim 8, wherein the piece of shape-recovering material has the shape of an elongated hollow tube with a longitudinal reference direction extending parallel to a direction of elongation of the tube.

15. The method of claim 14, wherein the first region is in the shape of a stripe extending parallel to the longitudinal reference direction.

16. The method of claim 8, wherein the piece of shape-recovering material is made of a material selected from the group consisting of polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene.

17. A method for enclosing a body, comprising the steps of:
    providing an elongated tube of shape-recovering material having a direction of elongation and having materials properties described by a recovered state and an expanded state which contracts toward the recovered state upon heating;
    processing the piece of shape-recovering tubing to have
       a first region in the recovered state, the first region comprising a stripe extending parallel to the direction of elongation, wherein the steps of processing includes the additional step of applying printing to the first region and
       a second region in the expanded state; positioning the tube of shape-recovering material overlying the body; and heating the second region so that it contracts toward the recovered state.

18. The method of claim 17, wherein the step of processing includes the steps of
    providing the tube of shape-recovering material with the first region in the recovered state and the second region in the recovered state, and thereafter stretching the second region to the expanded state while maintaining the first region in the recovered state.

19. The method of claim 17, including an additional step, after the step of stretching, of printing printed matter onto the first region.

20. The method of claim 17, wherein the step of processing includes the steps of providing the tube of shape-recovering material with the first region in the recovered state and the second region in the recovered state, thereafter stretching the first region to the expanded state and the second region to the expanded state, and thereafter contracting the first region to the recovered state.

21. The method of claim 17, wherein the piece of shape-recovering material has the shape of an elongated hollow tube with a longitudinal reference direction extending parallel to a direction of elongation of the tube.

22. The method of claim 17, wherein the piece of shape-recovering material is made of a material selected from the group consisting of polyolefins, polyvinylidene fluoride, polychloroprene, polyvinyl chloride, polyethylene terephthalate, silicone rubber, polytetrafluoroethylene, fluorinated ethylene propylene, and ethylene-tetrafluoroethylene.

* * * * *